United States Patent [19]

Clark et al.

[11] Patent Number: 4,829,568
[45] Date of Patent: May 9, 1989

[54] SYSTEM FOR THE PRINTING AND READING OF ENCRYPTED MESSAGES

[75] Inventors: John I. Clark, Milford; Alton B. Eckert, Norwalk, both of Conn.; David M. Warren, Woodmere, N.Y.

[73] Assignee: Pitney Bowes, Stamford, Conn.

[21] Appl. No.: 904,519

[22] Filed: Sep. 5, 1986

Related U.S. Application Data

[62] Division of Ser. No. 515,760, Jul. 21, 1983.

[51] Int. Cl.⁴ .............................................. G06F 9/00
[52] U.S. Cl. ..................................... 380/23; 101/71; 380/57; 382/1; 382/57; 400/104
[58] Field of Search .............. 382/1, 57, 69; 235/101, 235/432, 462, 494; 346/94; 101/71, 66, 67; 400/104, 105, 121; 380/3, 23, 51; 209/583, 584; 340/825.34

[56] References Cited

U.S. PATENT DOCUMENTS

| | | | |
|---|---|---|---|
| 3,990,558 | 11/1976 | Ehrat | 340/825.34 |
| 4,105,997 | 8/1978 | McGinn | 382/57 |
| 4,229,794 | 10/1980 | Foster | 235/432 |
| 4,253,158 | 2/1981 | McFiggans | 380/23 |
| 4,264,396 | 4/1981 | Stewart | 101/67 |
| 4,350,844 | 9/1982 | Stürzinger et al. | 380/51 |
| 4,376,299 | 3/1983 | Rivest | 380/23 |
| 4,422,376 | 12/1983 | Teraoka | 101/69 |
| 4,440,248 | 4/1984 | Teraoka | 235/462 |
| 4,447,890 | 5/1984 | Dowel et al. | 364/900 |
| 4,637,051 | 1/1987 | Clark | 382/1 |

FOREIGN PATENT DOCUMENTS 2032224 4/1930 United Kingdom .
2097330 11/1982 United Kingdom .

Primary Examiner—Leo H. Boudreau
Assistant Examiner—Joseph Mancuso
Attorney, Agent, or Firm—Michael J. DeSha; David E. Pitchenik; Melvin J. Scolnick

[57] ABSTRACT

A system for the metering of encrypted postage and similar indicia includes a device for printing such indicia and a device for reading such indicia. The printing is accomplished with a dot matrix printer driven by signals obtained by altering character generation signals with encryption signals. The interleaving is accomplished on a row-by-row basis by inserting delays from an encryption circuit into signals from a character generator circuit. The reading is accomplished by correlating received characters against a stored array of a symbols to determine the presence of a symbol, the extraction of coded data from character data of the received and identified character, and the comparison of the separated coded data with a reference code to determine the accuracy of the printed material. Thereby, forgery and alteration is inhibited. The coding is accomplished with the dot matrix format of the characters by displacing some of the dots slightly from the remainder so as to retain the general form of the character for recognition of the character while the displaced dots serve as the code for the encryption.

17 Claims, 11 Drawing Sheets

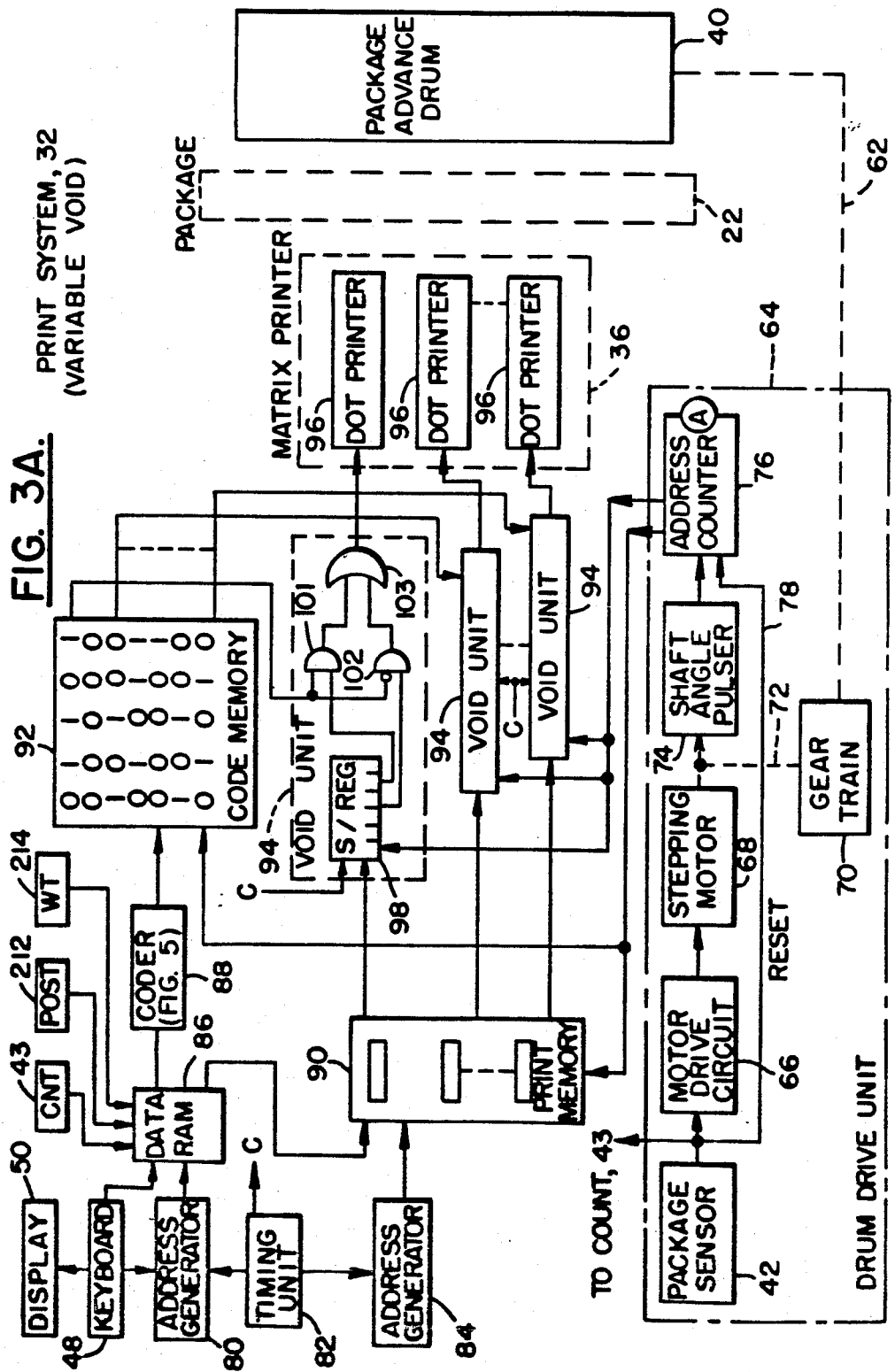

SYSTEM FOR THE PRINTING AND READING OF ENCRYPTED MESSAGES

This is a division, of application Ser. No. 515,760, filed July 21, 1983.

BACKGROUND OF THE INVENTION

This invention relates to devices for the metering of postage and similar indicia and, more particularly, to a metering device including electronic circuitry for the encryption of the indicia to be printed.

Reference is hereby made to copending related patent applications assigned to the same assignee as this application; application of John Clark entitled "System Having A Character Generator For Printing Encrypted Messages", Ser. No. 515,073, filed on July 18, 1983 now U.S. Pat. No. 4,637,051; application of Daniel Dlugos entitled "System For Printing Encrypted Messages With Bar-Code Representation", Ser. No. 515,086, filed on July 18, 1983 now U.S. Pat. No. 4,660,221; and application of John Clark and Daniel Dlugos entitled "System For Printing Encyrpted Messages With A Character Generator and Bar-Code Representation", Ser. No. 515,072, filed July 18, 1983 now U.S. Pat. No. 4,641,347.

Postage meters find extensive use, both in the United States and abroad, for imprinting postage on objects to be mailed. The postage may be applied by a self-sticking label which is imprinted by a print head enclosed within the meter, the label then being placed in adhering contact on the letter, parcel or other object to be mailed. Alternatively, the postage may be printed directly on the outer wrapping of the object being mailed. The printing apparatus is also capable of printing a short message in addition to the amounts of the postage so that, if desired, the meter can be used for the imprinting of suitable indicia designating instructions and/or routing for transport by private carrier as well as by the mail. Furthermore, if desired, the meter may be utilized for the imprinting of yet other forms of labels, such as tax stamps, assuming that governmental approval for such tax stamps is obtained.

A serious problem which has been encountered in the use of imprinted postage is the fraudulent adulteration of such postage labels whereby, in effect, the person adulterating the postage is stealing postage. A fraudulent label may enable someone to obtain postage, or in the case of a tax stamp, to avoid paying the tax.

SUMMARY OF THE INVENTION

The foregoing problem is overcome and other advantages are provided by a device for the metering of postage and similar indicia. The device includes electronic circuitry for the development of encryption symbology, and a print head which is driven by the electronic circuitry to imprint both the postage, or other indicia, in combination with the encryption markings. The indicia may be formed of alphanumeric characters or other printwork printed by a dot-matrix printer. Individual dots within the matrix of any one character can be offset slightly to include the presence of encrypted material while still permitting the character to be readily identified, individually or by an automatic reader. The encrypted material is used for verifying the message. An important feature of the electronic circuitry for performing the encryption process is the incorporation into the circuitry of a means for altering the encryption process in accordance with the amount of postage, the date, and, if desired, the sender and other data. Thereby, the message imprinted on the label is related to the encryption markings. In the event that the message is altered, either the encryption markings cannot be decoded or, if decoded, the resulting legend does not agree with the legend imprinted on the label.

BRIEF DESCRIPTION OF THE DRAWINGS

The foregoing aspects and other features of the invention are explained in the following description, taken in connection with the accompanying drawings wherein:

FIG. 3A is a block diagram of a first embodiment of a print system of FIG. 1 utilizing a variable void coding;

DETAILED DESCRIPTION

Figure 1:
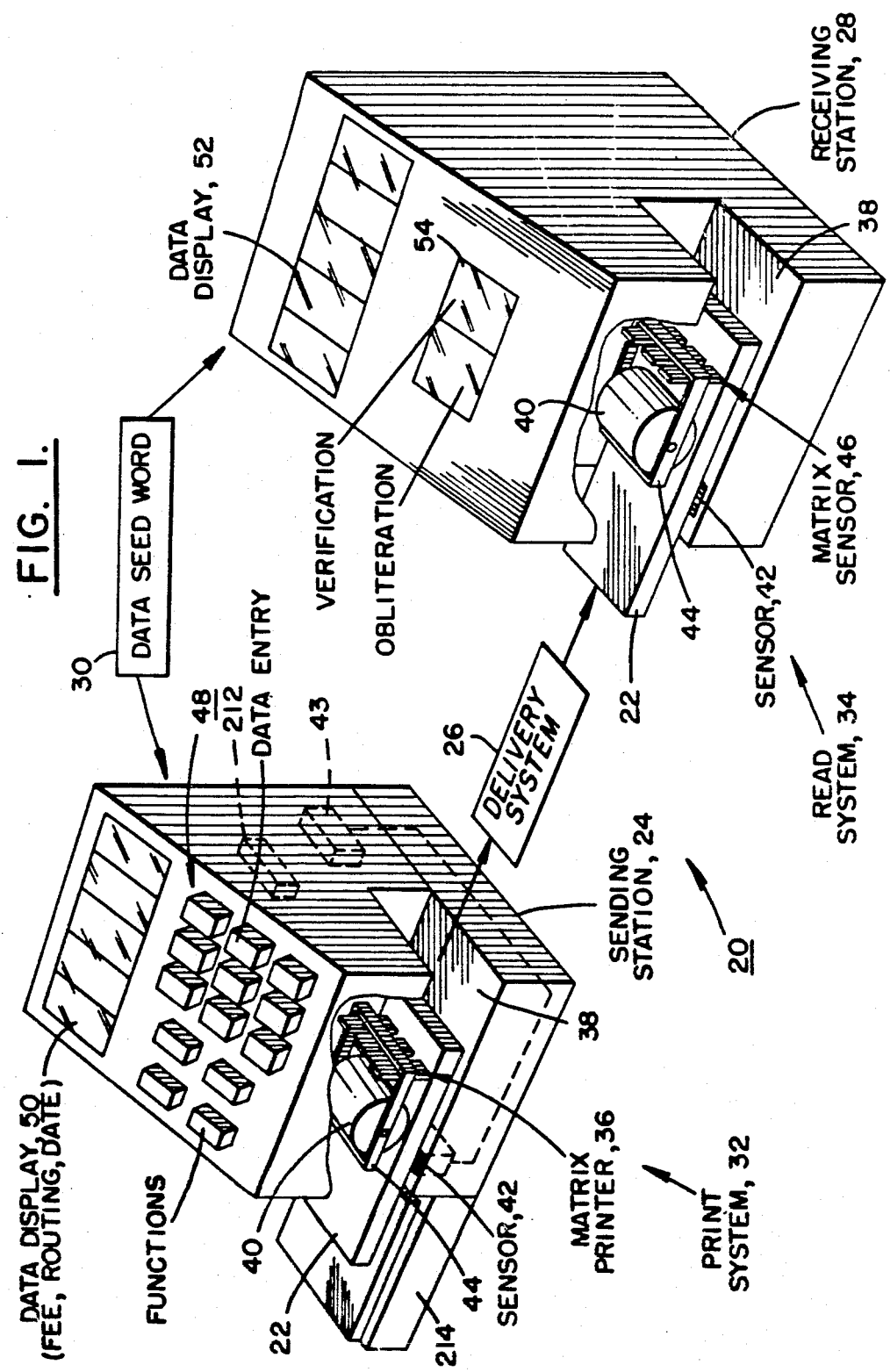
FIG. 1 shows a system incorporating the invention by imprinting delivery data, such as postage, on a package by a dot matrix printer wherein the positions of the dots have been offset to create voids as a security code.

In FIG. 1, a system 20 incorporates the invention for the transmission of a mailpiece or package 22 from a sending station 24 via a delivery system 26 to a receiving station 28. The term "package" is used only by way of example to illustrate the variety of objects which are sent from one location to another, both by use of the mail and by private carrier. Thus, the term "package" includes mailpieces such as letters, flats, envelopes, parcels and other objects which are sent via the mail, and have a surface for receipt of imprintings of postage and/or other indicia including messages. The term "package" also includes labels in those situations wherein the indicia or message is imprinted on a label which is then affixed to a mailpiece, in the case of postage, or to some other object such as bottle wherein the label is a tax stamp. The delivery system 26 may be any one of a number of systems such as, for example, a parcel delivery service or the postal service. The portrayal of the system 20 in FIG. 1 is stylized to facilitate explanation of the invention, with portions of the stations 24 and 28 being cut away to show components thereof utilized in the imprinting and reading of data on the outer cover, such as an envelope, of the mailpiece 22.

In accordance with the invention, the data is encrypted to ensure the validity of the data. The data includes, typically, the fee or postage, the date, a serial number of the sending station 24, and, if desired, a zip code or other form of routing code for automated sorting of the mailpieces 22. The encryption is accomplished by coding circuitry, to be described hereinafter, which utilizes a seed word in developing the code. The seed word is obtained from a base seed word 30 placed in both the sending station 24 and the receiving station 28, the base seed word 30 being altered in a manner to be described, in accordance with the date, the fee, and the serial number of the sending station 24 to provide the seed word utilized by the coding circuitry. The sending station 24 includes a print system 32 for imprinting the data on the mailpiece 22, while the receiving station 28 incorporates a corresponding read system 34 for reading the data imprinting on the mailpiece 22.

The print system 32 comprises a matrix printer 36 which includes a well known set of electronically actuated dot printing points in a printing head which, in accordance with electrical signals applied to respective ones of the points, imprints a row of dots which represent a portion of a letter, numeral, or other character. For example, such a printing head may incorporate ink jets or, alternatively, may employ heat or light in the case wherein heat-sensitive labels or light-sensitive labels are utilized. The mailpiece 22 is moved along a platform 38 of the sending station 24 by a roller 40, the roller 40 advancing the mailpiece 22 beneath the matrix printer 36 as the printer 36 imprints a succession of dots on the cover of the mailpiece 22. A sensor 42 detects the presence of the package 22 for activating the roller 40 The sensor 42 may have the form of any of a number of well known package sensors, to incorporate, for example, an electric eye or a roller which makes electrical contact with the roller 40. Thereby, a breaking of the light beam, or a breaking of the electric current signals the presence of the package 22 for activation of the roller 40 to advance the package 22 The roller 40 and the matrix printer 36 are positioned by means of a frame 44 within the sending station 24

The receiving station 28 also incorporates a roller 40 and a sensor 42 for advancing a package along a platform 38. A connector 43, shown in phantom inside the sending station 24, is coupled to the sensor 42 for counting output signals of the sensor 42 to provide a count of the respective packages 22 sensed by the sensor 42. The read system 34 includes a matrix sensor 46, the sensor 46 comprising a set of well known photo-electric sensors which are arranged along a row and positioned by a frame 44 as described previously for the sending station 24. The positions of the photo-electric sensors of the matrix sensor 46 corresponds to the positions of the print points of the matrix printer 36 so that the presence and absence of markings of the printer 36 can be sensed by the matrix sensor 46.

The sending station 24 further comprises a keyboard 48 and an alphanumeric display 50. The keyboard 48 includes function keys which identify the nature of the data which is being entered by data entry keys of the keyboard 48. Thus, for example, individual ones of the function keys are employed to identify the date, the amount of the fee, and routing data. The data to be entered appears in the display 50 after which it is entered into the electronic circuitry of the sending station 24 by pushing an enter key of the keyboard 48. The receiving station 28 also incorporates displays, there being a data display 52 as well as a verification display 54 which indicates that the message imprinted on the package 22 has been verified or that it has been obliterated so as to prevent verification.

Figure 2:
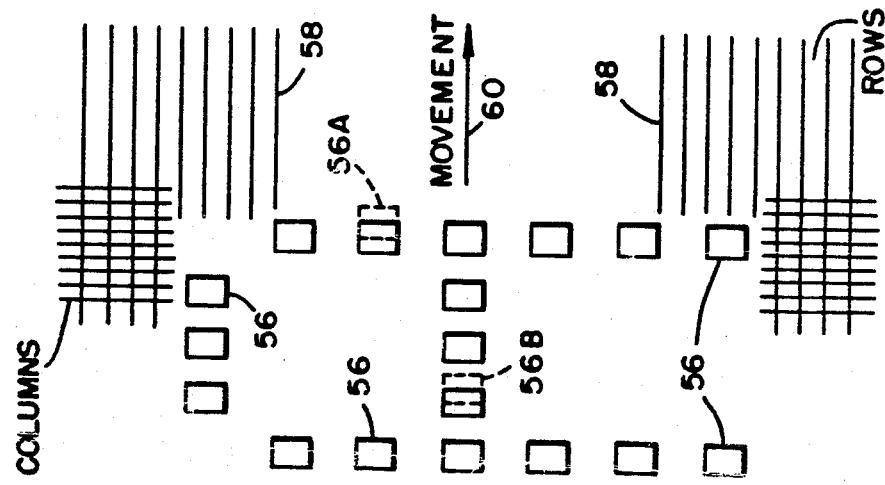
FIG. 2 shows the arrangement of dots in a 7×5 matrix superposed upon a grid for identifying voids produced by displacement of the dots.

With reference also to FIG. 2, there is shown a mode of encripting alphanumeric characters of the message imprinted on the mailpiece 22. This mode of encryption, which may be referred to as variable void coding is accomplished by offsetting the dots imprinted by respective printing points of the printer 36 so as to create voids at locations which would normally, in the absence of encryption, have imprinted dot. The field of dots in FIG. 2 is defined by a matrix of seven rows by five columns. Such a matrix is a standard matrix in the printing industry and, accordingly, is most readily employed in a postage meter or similar device for the imprinting of postage and transportation data on a mailpiece. While the invention is useful for fields of both larger and smaller arrays of dots than that disclosed in FIG. 2, in order to facilitate explanation of the invention, rt is to be assumed in the ensuing description that the 7×5 matrix is to be employed. Individual ones of the dots in FIG. 2 are identified by the legends 56 while two exemplary displaced dots 56A and 56B are disclosed in phantom. The phantom view indicates the positions which a dot 56 would occupy in the presence of encryption, the normal position, indicated by solid lines, being present in the absence of encryption In particular, it is noted that the displacement associated with the encryption provides a void equal to one-half the width of the dot 56. Thus, as may be seen in the cross-bar of the letter "A" depicted in FIG. 2, the offsetting of the dot 56B enlarges the space between neighboring dots, to the left of the dot 56B, while decreasing the space, between neighboring dots, to the right of the dot 56B. Accordingly, the void or space between one pair of neighboring dots is increased while the void or space between another set of neighboring dots is decreased. In the encryption process, only a relatively few of the dots of an alphanumeric character are so displaced, the remaining dots maintaining their regular positions to permit identification of the character imprinted on the mailpiece 22.

In accordance with a feature of the invention, a reference character without the displaced dots of the encryption process is compared to a received character having the displaced dots associated with the encryption process. The differences between the characters is thus a statement of the code.

FIG. 2 also shows a grid 58 superposed on the character "A" to explain the operation of the matrix sensor 46. The spacing between photoelectric elements of the matrix sensor 46 corresponds to the spacing between the rows of the grid 58, the horizontal lines being parallel to the arrow 60 which designates the direction of movement of the mailpiece 22. The spacing between the rows of the grid 58 is smaller than the spacing between centers of the elements of the matrix sensor 46 so as to permit the reading of the dots or other shaped markings of the character imprinted by the printer 36. Similarly, the rate of reading by the matrix sensor 46 is increased to provide a spacing between columns of the grid 58 which is smaller than the spacing between the dots of the printed character so that the matrix sensor 46 is able to respond to the variations in spacing between the dots resulting from the displacement associated with the encryption. By way of example, the spacings depicted between centers of the dots of the character in FIG. 2 are four times the spacing of the cells of the grid 58. Correspondingly, the grid 58 provides the read system 34 with a resolution four times that of the print system 32, and thereby enables the read system 34 to function even with characters that may have become partially obliterated, as well as in the situation wherein the alignment of the package 22 on the platform 38 in the receiving station 28 does not correspond precisely to the corresponding alignment in the sending station 24.

With reference now to FIG. 3A, there is provided a more detailed description of the components of the print system 32 of FIG. 1. The drum 40 is mechanically coupled via a line 62 to drive unit 64 which rotates the drum 40 for advancement of the mailpiece 22. The same form of drive unit 64 is also provided in the read system 34 of FIG. 4A, as will be described subsequently, for rotation of the drum 40 therein. The drive unit 64 comprises the mailpiece sensor 42, a motor drive circuit 66, a stepping motor 68, a gear train 70 mechanically coupled via a dashed line 72 to the motor 68, a shaft-angle pulser 74 also mechanically coupled via the line 72 to the motor 68, and an address counter 76.

In operation, the motor 68 is energized by the drive circuit 66 for rotation of the drum 40 via the gear train 70. The drive circuit 66 is triggered into operation by the sensor 42, and continues to operate the motor 68 until the sensor 42 ceases to sense the presence of the mailpiece 22. Thereby, the drum 40 is made to rotate a sufficient amount to move the mailpiece 22 past the drum 40. The momentum of the mailpiece 22 then carries it through the sending station 24, as well as through the receiving station 28 as will be described substantively with respect to FIG. 4A. The gear train 70 reduces the rate of rotation of the drum 40 to a much slower value than the rate of rotation of the output shaft of the motor 68 on line 72. The shaft-angle pulser 74 comprises well known circuitry such as that of a tachometer or encoder for providing an output electrical pulse to the counter 76 for each increment in rotation of the output shaft of the motor 68. Since the pulser 74 is mechanically locked to the drum 40 by the gear train 70, a counting by the address counter 76 provides a count which corresponds precisely to the position of the mailpiece 22 on the platform 38 of the sending station 24. The leading edge of the electric output signals of the sensor 42 on line 78 resets the counter 76 back to zero upon the arrival of the next mailpiece 22 at the sensor 42. The output count of the counter 76 will be utilized, as described hereinafter, for addressing components of the print system 32 for operation of the matrix printer 36.

Figure 5:
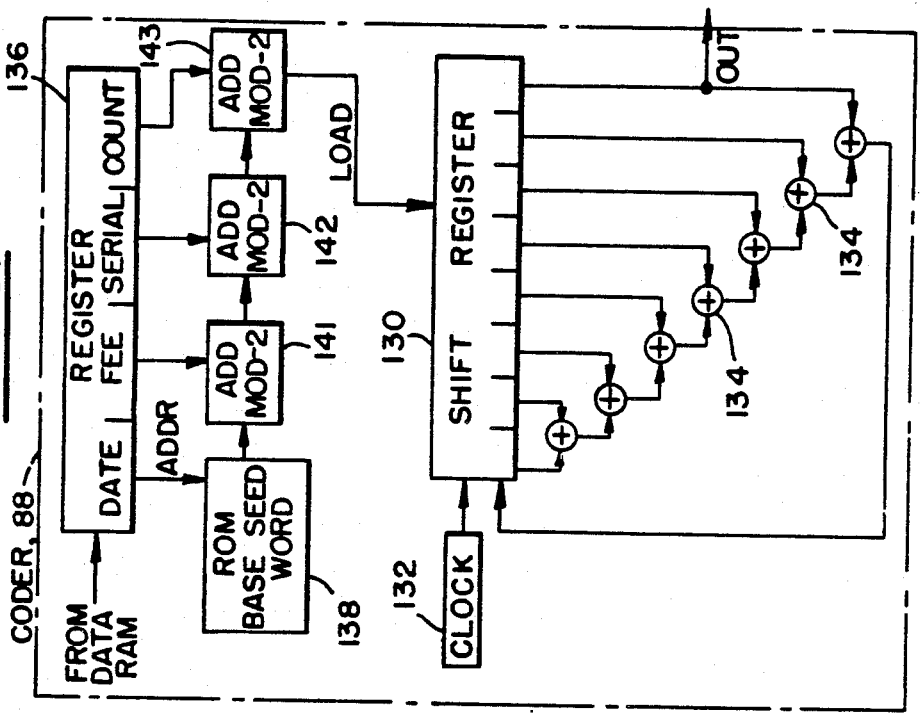
FIG. 5 is a block diagram of a coder utilized in the systems of FIGS. 3A-D and 4A-D.

The print system 32 further comprises an address generator 80, a timing unit 82 an address generator 84, a RAM 86 (random access memory) for the storage of data entered from other components including the keyboard 48 and the counter 43, a coder 88 for providing the encripting code as will be more fully described in FIG. 5, a memory 90, a memory 92, and a set of void units 94 for driving respective ones of a set of print points 96 of the matrix printer 36. Each void unit 94 is utilized for incorporating digits of the encryption code which are stored in the memory 92 into the printing process for displacing dots of the character matrix in accordance with the variable-void feature of the invention. Each void unit 94 comprises a shift register 98, two AND gates 101–102, and an OR gate 103. In the AND gate 102, 1 of the input terminals thereof is complimented, this terminal being coupled along with a corresponding terminal (not complimented) of the gate 101 to the code memory 92.

In operation, a person utilizing the sending station 24 enters data into the RAM 86 by use of the keys of the keyboard 48. As has been noted hereinabove, the keyboard 48 is also coupled to the display 50 for displaying the data which is to be entered into the RAM 86. During entry of the data, the signals of the keys of the keyboard 48 are also applied to the address generator 80 to activate the generator 80 to address the RAM 86 to designate the locations wherein the data of the keyboard 48 is to be stored within the RAM 86. The generator 80 is also utilized for addressing the RAM 86 during the outputting of data from the RAM 86 to the coder 88 and to the memory 90, the action of the generator 80 initiated by signals of the timing unit 82 during the outputting of the storage data. The timing unit 82 also initiates activity of the address generator 84 to designate locations within the memory 90 for receiving data from the RAM 86. The coder 88 utilizes the data of the RAM 86 in providing the digits which are stored in the code memory 92, and the memory 90 is utilized for applying the data of the RAM 86 via the void units 94 to the print points 96 of the matrix printer 36.

During the first stage of the operation of the sending station 24, the data such as the amount of postage, the routing as via zip code, the date and the package count of the counter 43 are entered into the RAM 86 for the subsequent imprinting of a message on the package 22. The message includes the date, the package count, the serial number of the sending station 24, the delivery fee or postage, and optionally zip code and/or city, state of the origination. In accordance with the invention, the message also includes, in encrypted form, a verification of the message showing that the message was indeed printed by the sending station 24, and not by an impostor.

Accordingly, the second stage in the operation is the transfer of data from the RAM 86 to the coder 88 for the generation of the encrypted verification, and to the memory 90 for operation of the matrix printer 36. The first two stages are initiated sequentially in response to the aforementioned signals of the timing unit 82 to the generators 80 and 84. During the second stage of the operation, the coder 88 generates the requisite code and applies the digits for control of the encryption process to the code memory 92 in a manner to be described subsequently with reference to FIG. 5.

The third stage of the operation begins when the package sensor 42 has detected the presence of a mailpiece 22 or other object such as a letter which is to be mailed. As has been noted above, the sensor 42 resets the counter 76 and initiates operation of the motor drive circuit 66 with the resultant counting of the counter 76. The counter 76 counts out successive addresses of both the print memory 90 and the code memory 92 for transferring the data contained therein to the matrix printer 36. During the transfer of data from the RAM 86 to the memory 90, the data is arranged in accordance with the rows of dots of the matrix of each character which is to be imprinted on the mailpiece 22. Thus, in response to each designation of character by the keyboard 48, the RAM 86 makes available to the memory 90 the succession of dots for each row of the characters matrix as has been explained with reference to FIG. 2. Accordingly, upon transfer of the data from the RAM 86 to individual sections of the print memory 90, respective sections of the memory 90 store the requisite sequence of dots which are to be applied by the corresponding print points 96 to the mailpiece 22 during the printing operation.

In response to the addressing by the counter 76, the data is read out of the respective section of the memory 90 and of the respective sections of the memory 92 into the corresponding void units 94 for application to the corresponding printheads 96. With respect to the operation of the void units 94, each void unit 94 operates in the same manner. In each void unit 94, data from the memory 90 is applied to an input terminal of the shift register 98 through which it is clocked at a higher rate than the entry of data from the memory 90 into the register 98. For example, the rate of clocking in the register 98 may be at a rate four times greater than the rate of entry of the data from the memory 90 into the register 98. The clocking is accomplished in response to clock pulses applied at terminal C from a clock (not shown) within the timing unit 82.

The foregoing factor of four in the clock rate corresponds to the factor of four (described in FIG. 2) between a dot of the printed character and a cell of the grid 58. Thus, as a digital signal enters the shift register 98 from the memory 90, the digital signal then propagates rapidly through the shift register 98 through successive cells thereof. As these digital signals propagate through the shift register 98, the mailpiece 22 is advanced by rotation of the drum 40. Each increment in time associated with the propagation from cell to cell of the shift register 98 corresponds to an increment in position of the package 22. Each cell of the register 98 is provided with an output tap or terminal whereby a signal can be extracted after a predetermined amount of delay from the time of transfer of the signal from the memory 90 to the shift register 98.

Each row of the code memory 92 is coupled to a corresponding one of the void units 94. More specifically, as has been described above, in each void unit 94, an output line of the code memory 92 is applied to an input terminal of each of the gates 101-102. In response to the outputting of a logic 0 signal from the code memory 92, the AND gate 102 is activated due to the complementing of its input terminal coupled to the memory 92. With the activating of the AND gate 102, the digital signals of the shift register 98 are coupled via the AND gate 102 and the OR gate 103 to the print point 96. In response to the outputting of a logic 1 signal from the code memory 92, the AND gate 102 is deactivated and the AND gate 101 is activated to pass a digital signal from the shift register 98 via the OR gate 103 to the printhead 96. Since the AND gate 101 is coupled to a cell of the register 98 downstream from the connection of the AND gate 102 to a cell of the register 98, the activation of the gate 101 results in a delay of the operation of the print point 96. In view of the continuous motion of the package 92 by the rotation of the drum 40, the delay introduced by the gate 101 results in a displacement of the position of the dots, such as the previously described displacement of the dots 56A-B of FIG. 2. In view of the ratio of four cells of the grid 58 corresponding to the spacing between centers of the dots 56 of FIG. 2, the delay of one of the registers 98 (as depicted by the connections of the gates 101 and 102 to the register 98) provides for a displacement equal to one-half the width of a dot 56 as depicted in FIG. 2. Accordingly, for each occurrence of a logic 1 from the code memory 92, there is presented a corresponding displacement in the position of a dot of the character in FIG. 2. For ease of portraying such displacements, only two such displacements are shown in the Figure, this being the displacement of the dots 56A-B. With the displacement, there is created a void at the site where the dot 56 would have been located in the absence of the encripting command from the signals of the code memory 92. Thus, a void unit 94 has introduced a void into the printed character so as to encrypt the character with a code that is to be utilized for verifying the printed message.

Figure 3B:
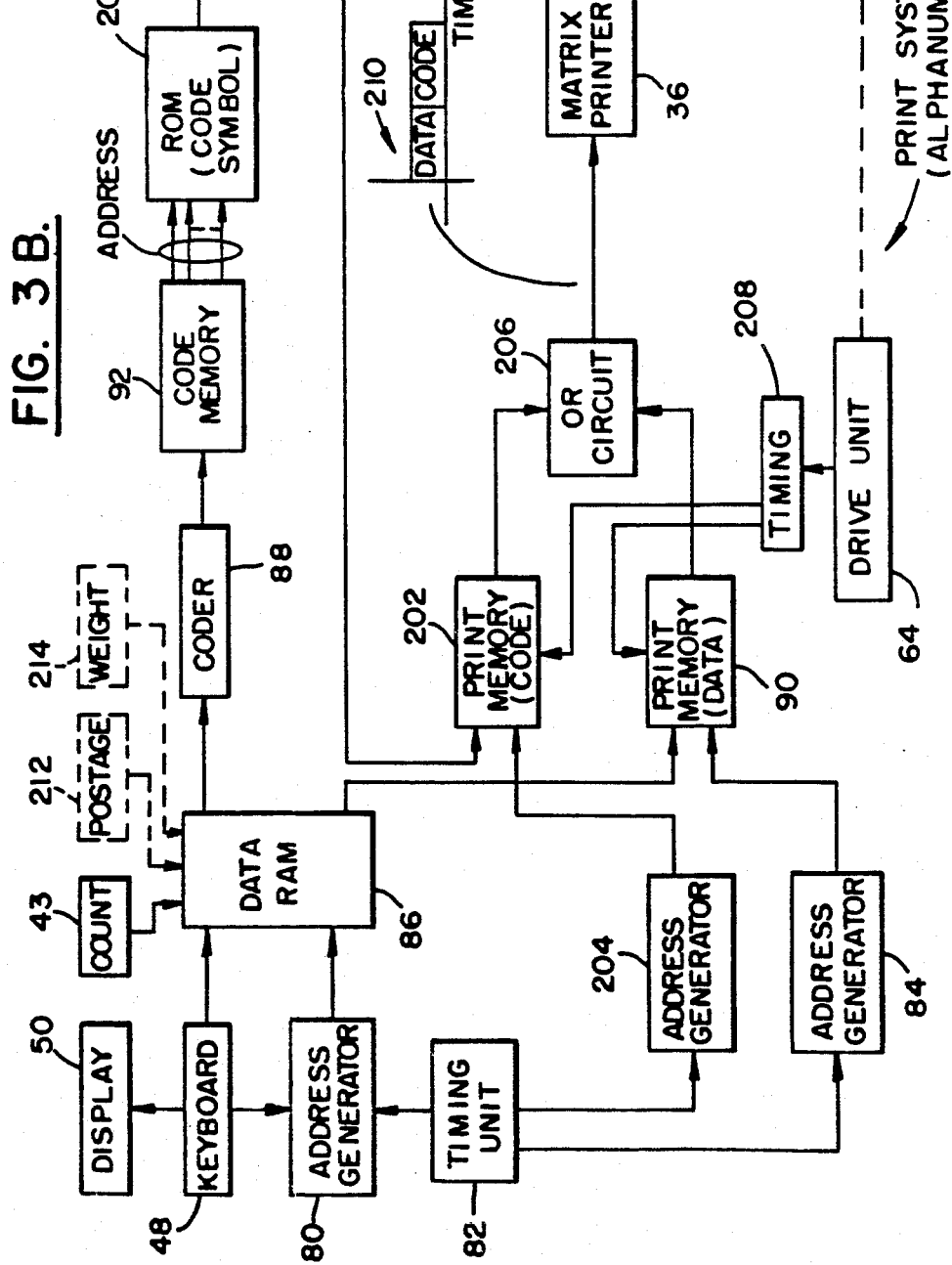
FIG. 3B is a block diagram of a second embodiment of the print system of FIG. 1 utilizing additional alphanumeric characters for the coding.
Figure 4B:
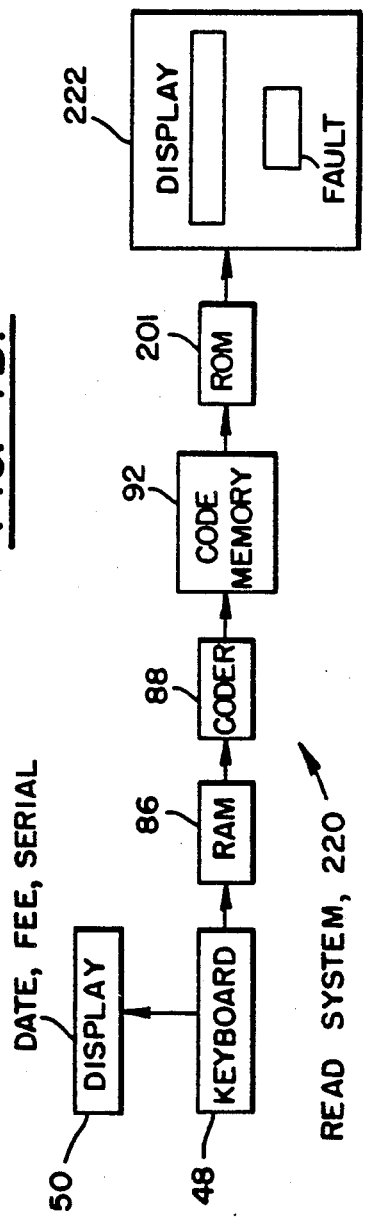
FIG. 4B is a block diagram of a second embodiment of the read system of FIG. 1 for coding implemented by additional alphanumeric characters.
Figure 4A:
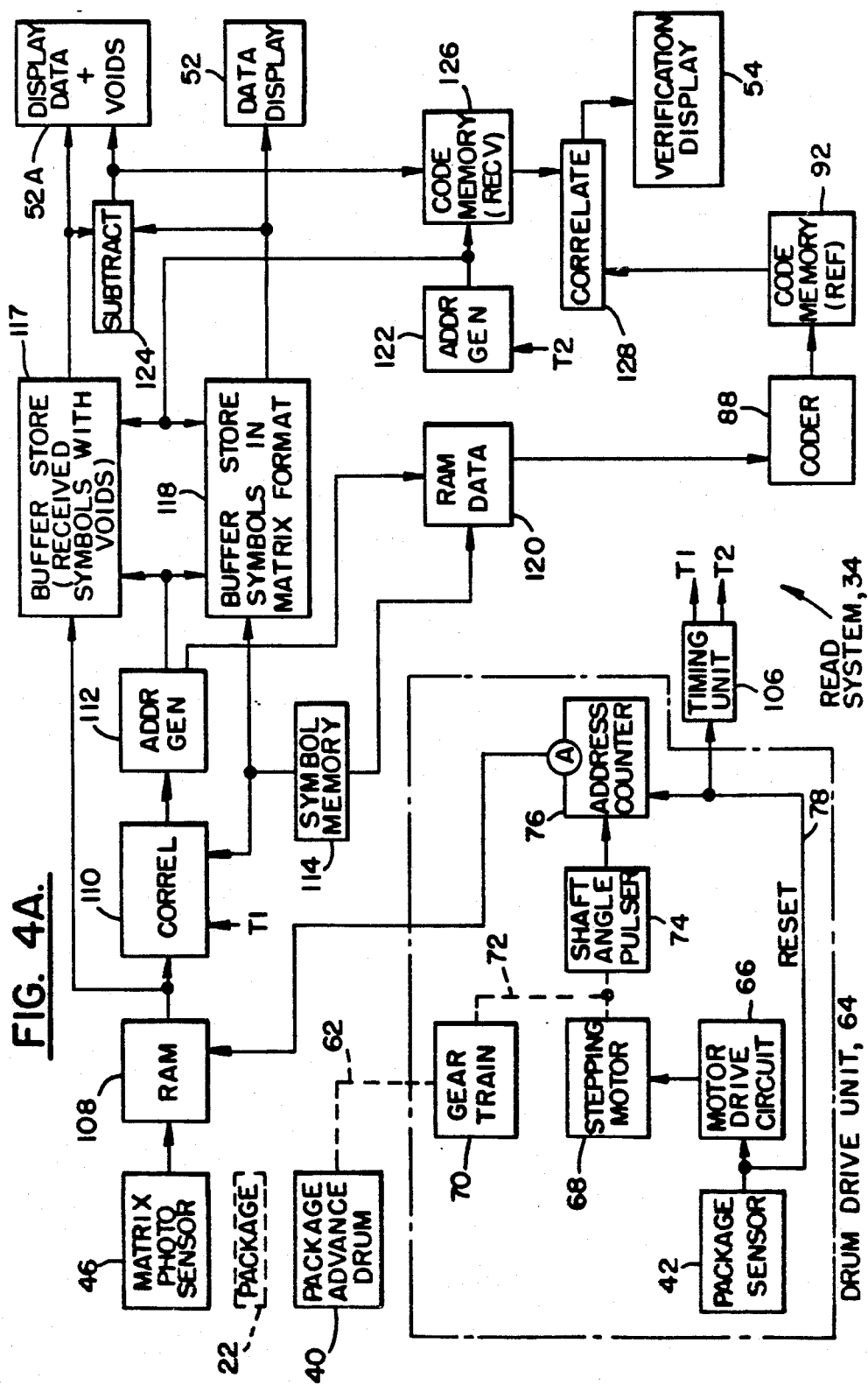
FIG. 4A is a block diagram of a first embodiment of a read system of FIG. 1 utilizing the variable void coding.

With reference to FIG. 4A, the read system 34 operates in a manner complementary to that of the print system 32 of FIG. 3A. As has been noted hereinabove, the receiving station 28 includes a drum drive unit 64 for rotating a drum 40 to advance the package 22 beneath the matrix sensor 46. The reset line 78 of the drive unit 64 is also utilized to reset a timing unit 106 which provides timing signals at terminals T1 and T2 for operating components of the system 34 as will now be described The read system 34 comprises a RAM 108, a correlator 110, an address generator 112, a memory 114, buffer storage unit 117-118, a RAM 120, an address generator 122, a subtractor 124, a memory 126 and a correlator 128. Also included in the system 34 are the data display 52 and the verification display 54, previously described with reference to FIG. 1, as well as an optional display 52A. In addition, the system 34 includes a coder 88 and a code memory 92 which have been described with reference to FIG. 3A.

In operation, upon the sensing of a mailpiece 22 at the receiving station 28 (FIG. 1), the address counter 76 of the drive unit 64 addresses the RAM 108 to enter data from the matrix sensor 46 as the mailpiece 22 moves along the platform 38. The counting of the counter 76 is synchronized with the movement of the package 22 by the shaft-angle pulser 74. The counter 76 includes an additional terminal designated as terminal A in FIGS. 3 and 4, for providing a high speed counting at a rate four times that of the addressing rate utilized in the print system 32 of FIG. 3A. This is readily accomplished by deleting the least-significant bits from the lower rate counting output terminal of the counter 76. The counting rate at the terminal A of the counter 76 is utilized in FIG. 4A to address the RAM 108 at the rate corresponding to the density of the cells of the grid 58 in FIG. 2. Thus, as the package 22 advances past the matrix sensor 46, the signals of the photo-electric elements of the matrix sensor 46 are sampled and are entered into the RAM 108 at the rate four columns of the grid 58 for each column of dots 56 of the character in FIG. 2. In addition, the close spacing of the photo-electric elements of the matrix sensor 46 provide for four rows of samples, in the grid 58 for each row of dots 56 of the character in FIG. 2. The matrix sensor 46 extends well beyond the top and bottom of the text printed on the bottom of the mailpiece 22 to be able to receive the printed message even if the imprint on the mailpiece 22 is slightly offset from the position of the matrix sensor 46.

The operation continues with the correlator 110, the address generator 112, the memory 114 and the buffer storage units 117 and 118. The operation of the correlator 110 is initiated by a signal of the timing unit 106 subsequent to the storing of the data in the RAM 108. The timing signal is obtained with the aid of the package sensor 42 which changes the state of the signal on line 78 from a logic 1 to a logic 0 when the mailpiece 22 has completely passed by the sensor 42. Thereby, the timing unit 106 is signalled by the sensor 42 that the reading of data by the matrix sensor 46 has been completed and that accordingly, the stored data can be outputted from the RAM 108.

The correlator 110 and the address generator 112 react with the RAM 108 in a well known fashion for transferring the message from the RAM 108 to the storage unit 117. Automated readers of printed matter are commercially available, and are equipped with circuitry for extraction of the message even if the object being read is slightly offset from the orientation of the reading head. Such an adjustment offsetting is readily accomplished by correlating received symbols with symbols stored in a reference memory, this being the memory 114. By cycling through the various storage cells of the RAM 108, the correlator 110 correlates the individual characters stored in the RAM 108 with the reference characters of the memory 114 so as to determine which characters, or symbols have actually been sensed by the matrix sensor 46. When a correlation is obtained between the received symbol and the reference symbol, the correlator 110 triggers the generator 112 to address a location in the storage unit 117 for entering the received symbol. Simultaneously, with the using of the storage unit 117, the generator 112 also addresses the storage unit 118 for entering the reference symbol from the memory 114. The character, or symbol, stored in the storage unit 117 differs from that stored in the storage unit 118 in that the received character of the storage unit 117 includes the variable voids of the encryption process while the characters stored in the storage unit 118 is free of the voids of the encryption process. The succession of reference characters entered into the storage unit 118 are also applied via the memory 114 and the address generator 112 to the RAM 120 so as to store the data of the complete message in the RAM 120.

The final step in the operation of the read system 34 can now be accomplished by utilizing the data stored in the storage units 117-118 and in the RAM 120. First, it is noted that the reference symbols are provided by the memory 114 to the correlator 110 and to the storage unit 118 in the form of the dot matrix presented in FIG. 2 so that a comparison can be made between the dot-matrix representation of the character in the storage unit 117. With respect to the RAM 120, the memory 114 provides only a digital word identifying each of the characters. Since the storage unit 118 contains the complete dot-matrix representation of each symbol, the symbols are readily outputted from the storage unit 118 directly to the data display 52 Thereby, as the characters are successively outputted from the storage units 118 to the display 52, the entire message builds up within the display 52 for presentation to a person utilizing the receiving station 28 of FIG. 1.

In accordance with a feature of the invention, the verification of the received message is obtained by comparing the received characters of the storage unit 117 with the corresponding reference characters of the storage units 118. This is accomplished by subtracting, cell by cell in accordance with the grid 58, the data stored in the storage unit 118 from the data stored in the storage unit 117. The cell-by-cell process is implemented by sequentially addressing the respective storage locations by the address generator 122. The address generator 122 is operated in response to a timing signal from the timing unit 106 so as to implement the foregoing addressing after the correlator 110 has directed the entry of the characters into the storage units 117-118. The subtraction is accomplished by the subtractor 124, and the results of the subtraction are entered into the memory 126 in response to an addressing thereof by the generator 122. It is readily appreciated that, with reference to a comparison of the characters stored in the two storage units 117-118, that in the event that corresponding cells of the grid 58 have equal value of logic signals, the logic 0 or a logic 1, then the output of the subtractor 124 is zero. On the other hand, if a void is present due to the encryption process, then the logic value stored at the corresponding grid cells will differ and, accordingly, the subtractor 124 will output a logic 1 to the memory 126. Thereby, the memory 126 stores a representation of the encryption code as received by the receiving station 28. Assuming that there has been no obliteration of the printed message, and that the printed message is a valid message as distinguished from a message printed by an impostor, then the array of data stored in the code memory 126 will be identical to the array of data stored in the code memory 92 of FIG. 3A.

The data stored in the code memory 126 is to be compared with the data of the code memory 92 to determine that a valid message has been transmitted. Accordingly, the coder 88 of FIG. 4A is activated with the received data in the RAM 120 in the same manner as was described previously for the activation of the coder 88 with the data of the RAM 86 in FIG. 3A. The coder 88 (FIG. 4A) then generates the reference code for storage in the memory 92. The codes of the memories 126 and 92 are then correlated by the correlator 128 which signals the display 54 to indicate a verification upon the obtaining of a good correlation, or to show obliteration, in the event that an inadequate correlation is obtained. It is to be understood that an inadequate correlation can be due to either obliteration or the act of an impostor. In either case, the user of the receiving station 28 has been alerted to the fact that the message imprinted on the mailpiece 22 cannot be verified. Both the correlators 128 and 110 are understood to include an adjustable reference level against which the correlation is performed since, in practice, it must be assumed that various markings such as dirt and scratches will appear on the package 22 which will provide a less than perfect correlation even with a valid message.

If desired, the display 52A may be used to present the alphanumeric indicia with the variable void coding. For this purpose, the output signals of the storage unit 117, in addition to being coupled to the subtractor 124, are also coupled to the display 52A. In addition, the foregoing output signals of the subtractor 124 are also coupled to the display 52A, these signals being synchronized with corresponding ones of the storage unit 117 and indicating the presence of a displaced pixel. In response to the subtractor signals, the display 52A provides for a blinking or coloring of the displaced pixels so that personnel utilizing the read system 34 can readily observe the coding of the indicia.

With reference to FIG. 5, there is shown a simplified representation of a coder 88. Coding devices are readily available commercially and by way of example, a maximal-length shift-register code generator is described in FIG. 5. The coder 88 comprises a shift register 130, which stores a seed word, and is driven by a clock 132. A set of modulo-2 adders 134 sum the contents of successive ones of the cells of the shift register, with the resultant sum being inputted to the first cell of the register 130. The contents of the right-hand cell of the shift register 130 is designated as the output terminal of the coder 88.

In accordance with a feature of the invention, the seed word is generated by use of input data relating to one or more parameters such as the date, the fee, the serial number of the sending station 24, and the count of mailpieces and other packages provided by the counter 43. Accordingly, the coder 88 further comprises a register 136 for receipt of the input data, a ROM (read only memory) 138 and thee adders 141-143. The ROM 138 stores a set of seed words which are addressed in accordance with the three least significant bits of the data, there being accordingly eight base seed words stored in the ROM 138. The selected base seed word is then added modulo-2 with the fee at the adder 141 and again added modulo-2 with the serial number of the sending station 24 at the adder 42, and again added modulo-2 with the piece count of the counter 43. The serial number is being permanently stored in the register 136. The output digital word of the adder 143 is then loaded into the shift register 30 to serve as the seed word from which the code is generated by the coder 88.

It is to be understood that the foregoing contributions to the seed word are presented by way of example. Thus, if desired, the contribution of the serial number and/or the fee may be deleted. The use of the date and the piece count in the composition of the seed word is advantageous in providing a seed word which varies from mailpiece to mailpiece and from day to day, a clear benefit for improved security. In the event that a microprocessor (not shown) be incorporated in the sending station 24 and the receiving station 28, other forms of codes can be generated such as those of the National Bureau of Standards based on the multiplication of pairs of large numbers.

The foregoing print system and read system has provided an effective way of introducing an encrypted code into a printed message which can readily verify the validity of the message. The use of the variable voids permits the message to be read either manually or by machine, while obtaining the encrypted identification. It is also noted that the foregoing systems also are applicable for any form of printed symbol, whether readable manually or only by machine. Thereby, if desired, the imprintings on the mailpiece 22 can be accomplished with a set of nonsense symbols which are recognizable only by use of the stored reference symbols in the read system. Thereby, a system for assuring payment of the fee imprinted for postage, taxes and other purposes has been disclosed.

It is furthermore noted that the message need not be imprinted only on a flat type of package but that, if desired, the message may be imprinted on a label or stamp which can later be affixed by labeling equipment to a container such as a bottle. Thereby, the system of the invention can also be utilized for the affixation of tax stamps to liquor bottles as well as to other objects requiring a tax. The reading process can then be accomplished automatically, and has been described hereinabove, by use of a conveyor (not shown) to move the bottle or other objects past the matrix sensor for reading the legend imprinted on the tax stamp or other label. Thereby, fraudulent stamps or labels can be detected.

COMBINATION OF CODED SYMBOLS WITH DATA SYMBOLS

By way of alternative embodiments, it is noted that the security can be obtained by having a set of characters which designate the date, the fee, the piece count and the serial number of the sending station, with additional characters being supplied as a code. The characters of the code are based on the values the date, the fee and the serial number as has been disclosed in the previous embodiment. The code characters may be applied after piece count, or interleaved therewith. In either event, a predetermined timing arrangement is utilized as to determine which of the characters represent the data, and which of the characters represent the code.

FIG. 3B shows a print system 200 which is an alternative embodiment of the print system 32 of FIG. 3A. The system 200 provides for the printing of data characters plus code characters, and includes many of the components of the system 32. The system 200 comprises a ROM (read-only memory) 201, a print memory 202, an address generator 204, an OR circuit 206, and a timing unit 208 which provides for the arrangement of the characters as is portrayed in the graph 210. Also included in the system 200 are components which have been previously described, namely, the display 50, the keyboard 48, the address generator 80, the timing unit 82, the address generator 84, the RAM 86, the coder 88, the print memory 90, the drive unit 64, the code memory 92, the matrix printer 36, and the drum 40. Since the print system 200 provides both the data and the coding by means of alphanumerics, the matrix printer 36 may be replaced by some other form (not shown) of alphanumeric printer if desired.

The operation of the system 200 follows that of the system 32. Thus, the coder 88 provides a code word based on the date, the fee, the serial number, and the piece count which then produces the code in the memory 92. The output terminals of the memory 92 provide an address for selecting a code symbol or code character from the ROM 201. The print memory 90, under instruction from the address generator 84, stores the data which is to be printed on the mailpiece 22. Similarly, the print memory 202, under instruction from the address generator 204 stores the code characters which are to be imprinted on the mailpiece 22. The operation of the generators 84 and 204 is controlled by timing signals from the timing unit 82. The arrangement of the contents of the memory 202 follows that of the memory 90 so that the contents of the memory 202 can be applied directly to the matrix printer 36. The data of the memory 90 and the code of the memory 202 are coupled alternately via the OR circuit 206 to the matrix printer 36. Timing signals for operation of the read out of the contents of the memories 90 and 202 is accomplished by signals of the timing unit 208, the timing unit 208 being driven by an output signal of the address counter 76 of the drive unit 64. Thereby, as the drum 40 advances the package 22 before the printer 36, the printer 36 imprints the package with both the data characters and the code characters as is portrayed in the graph 210.

One relatively simple form of code which may be imprinted on a mailpiece or other form of package 22 consists of a four-digit number representing the piece count of the counter 43 followed by a one digit code number. The coding operation (FIG. 5) involves the modification of a base seed word by key board-entered data such as the fee and the date. Other data such as the serial number and the piece count are entered automatically into the RAM 86 for use by the coder 88.

As an example of still further data which may be utilized by the coder 88, in lieu of the foregoing or in addition thereto, are the total amount of prepaid postage stored in a system of registers 212 and the weight of a mailpiece or package 22 as provided by a scale 214. The register system 212 and the scale 214 are connected to the RAM 86, as shown in phantom in FIG. 3B, and also appear in FIG. 1. With reference to FIG. 5, the register 136 of the coder 88 would be enlarged to include the weight and total prepaid postage, and additional adders (not shown) such as the adder 141 would be employed to combine the weight and postage with the base seed word.

FIG. 4B presents the companion read system 220 for the print system 200. The system 220 is substantially less complex than the read system 34, the reduced complexity being obtained by a manual entry of the printed data on the mailpiece 22 into the system 220. Upon entry of the printed data into the system 220, the date, the fee, the piece count and the serial number are utilized, as previously described with reference to the read system 34, to produce the corresponding code. If the piece weight is utilized, the package is weighted and the weight is entered at the keyboard. If the prepaid postage is utilized for assumed transmission by the postal service, such value is known at the post office (herein the receiving station 28) so as to be enterable by the keyboard. In the read system 220, the regenerated reference code appears on a display for visual comparison by an operator of the system.

The system 220 comprises the keyboard 48, the display 50, the RAM 86, the coder 88 and the code memory 92 which have been previously described with reference to FIGS. 3A and 3B. In addition, the system 220 includes the ROM 201, previously described in FIG. 3B and a display 222. In operation, the person using the system 220 reads the message printed on the mailpiece 22, and enters the characters via the keyboard 48. The keyboard 48 activates the display 50 to show the characters entered, thus, providing the message comprising the date, the fee, piece count and the serial number of sending station. The keyboard 48 also activates the RAM 86 to provide the date, the fee the piece count and the serial number (and the weight and prepaid postage if this date is utilized) to the coder 88 which utilizes this data to produce the code in the memory 92. The code words in the memory 92 then address a ROM 201 to produce the code characters on the display 222. In the event that the data has been improperly entered into the keyboard 48, a bogus address may be applied by the code memory 92 to the ROM 201 in which case a fault indicator will be illuminated on the display 222 to alert the operator of the system. Alternatively, if there has been a tampering with the message imprinted on the package, the display 222 may show a set of code characters, however, the set shown on the display 222 will differ from that actually imprinted on the package 22. Thereby, the operator of the system 220 has been alerted to a tampering of the printed message.

With respect to the read system 220, it is noted that should it be desirable to have automatic reading instead of the manual inputting, the read system 34 of FIG. 4A is readily modified to provide the function of the system 220 of FIG. 4B. Such modification is attained by replacing the correlator 110 (FIG. 4A) with a timing unit, corresponding to the timing unit 208 of FIG. 3B, for alternately switching the data and the code characters received from the photosensor 46 into the buffer storage units 118 and 117. The ROM 201 would be connected between code memory 92 and correlator 128, and the buffer storage unit 117 would be coupled directly to the correlator 128. Thus, the correlator 128 would directly correlate the set of code characters which was read from the package 22 with the set of code characters of the reference. Upon obtaining a proper correlation, the display 54 would indicate verification of the printed message.

BAR-CODE EMBODIMENT

Figure 3C:
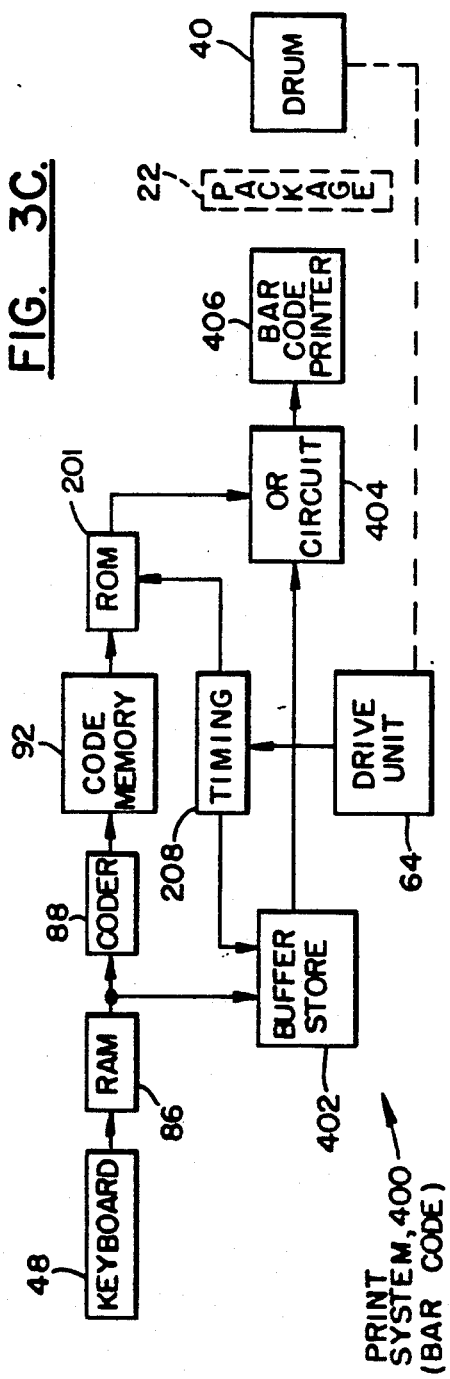
FIG. 3C is a block of a third embodiment of the print system of FIG. 1 utilizing a bar-code form of indicia.

The message printed on the mailpiece 22 by the succession of characters, as disclosed in FIG. 3B, may alternatively be printed by means of a bar code as is now disclosed in the print system 400 of FIG. 3C. The print system 400 has components previously described with reference to the print system 200 of FIG. 3B, these components being the keyboard 48, the RAM 86, the coder 88, the code memory 92 and the ROM 201. The operation of the system 400 follows that of the system 200 and, accordingly, the characters commanded by the keyboard 48 are applied by the RAM 86 to the coder 88, and also to a buffer storage unit 402. The coder 88 utilizes the information of the date, the fee, and the serial number of the sending station to generate the coded words which are stored in the memory 92. If desired, the piece count may also be utilized. The output lines of the memory 92 address the ROM 201 to select suitable alphanumeric characters which can be printed by a bar code printer. The system 400 further comprises an OR circuit 404 and a bar code printer 406, with the OR circuit 404 being connected to output terminals of both the ROM 201 and the storage unit 402 for alternately coupling the output signals to the printer 406. The alternate coupling is accomplished by timing signals provided by a timing unit such as the timing unit 208 which was utilized in the system 200 of FIG. 3B. The printer 406 is understood to include the generator and other circuitry commonly found in bar code printers for converting the character command signal to a succession of lines of the bar code (not shown). The printer 406 then imprints the bar code on the mailpiece 22. The presentation of the printed message on the mailpiece 22 follows that disclosed in the graph 210 of FIG. 3B.

Figure 4C:
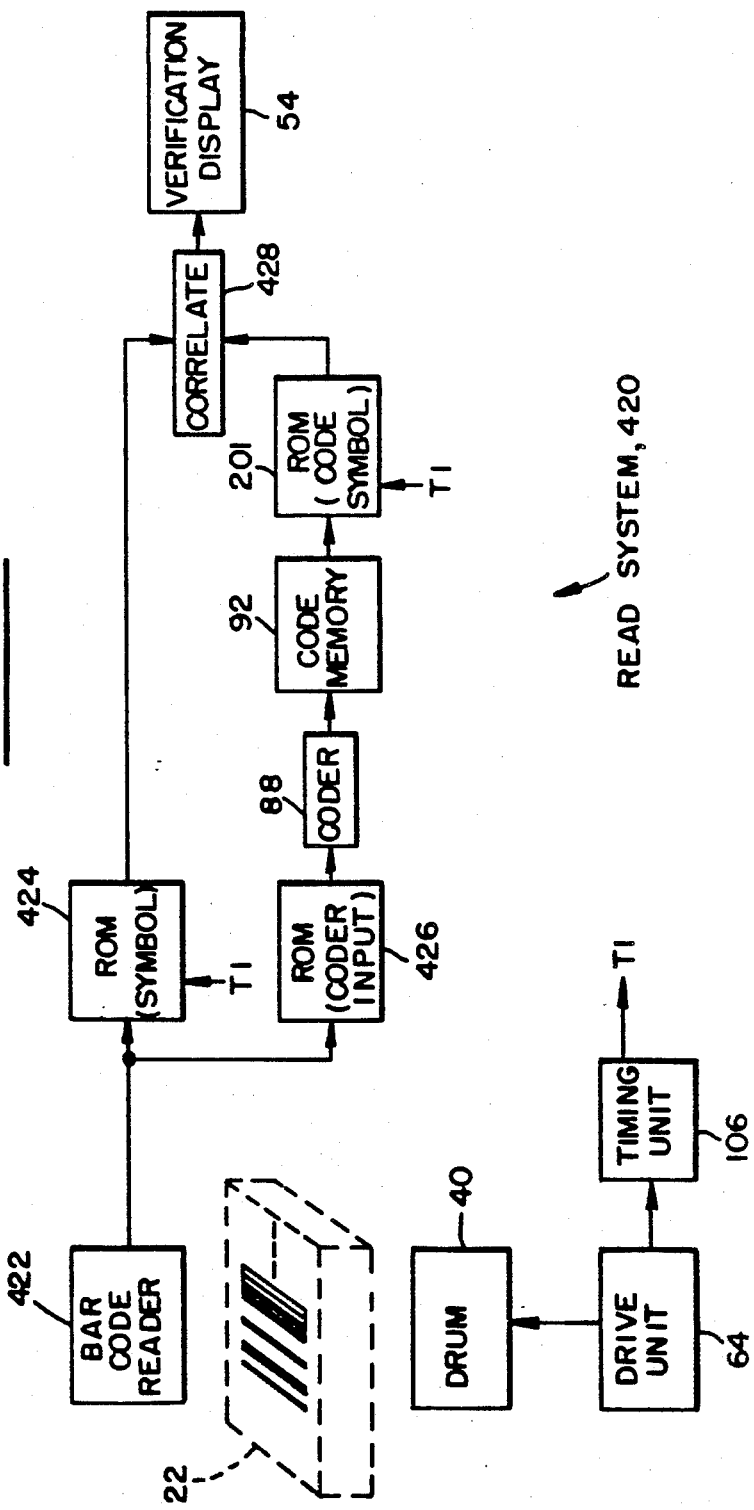
FIG. 4C is a block diagram of a third embodiment of the read system of FIG. 1 for use with bar-code indicia.

The companion read system 420 for the print system 400 is disclosed in FIG. 4C. The system 420 functions in a manner analogous to that of the read system 34 of FIG. 4A, and contains some of the components of the system 34 as well as components of the print system 400 of FIG. 3C. The system 420 comprises the drum 40, the drive unit 64, the timing unit 106, the coder 88, the code memory 92, the ROM 201 and the verification display 54 previously disclosed in FIGS. 4A and 3C. In addition, the system 420 comprises a bar code reader 422 of well-known configuration, a ROM 424 for converting output digital signals of the reader 422 to the actual symbol represented by the reader 422, a ROM 426 for converting the output digital signal of the reader 422 to the input digital format utilized by the coder 88, and a correlator 428. Both the bar code printer 406 of FIG. 3C and the reader 422 as well as the actual code are well known and are in common use. A portion of a bar code is portrayed, by way of example, on the mailpiece 22.

In operation, the drum 40 advances the mailpiece before the reader 422, enabling the reader 422 to read the code and apply the resultant characters of the reading to the ROMs 424 and 426. The drum 40 is driven by the drive unit 64 which, as has been disclosed previously with respect to FIG. 4A, activates the timing unit 106 to provide timing signals synchronized to the movement of the drum 40 and the package 22. The output data of the ROM 426, comprising the date, the fee, and the serial number of the sending station, and/or other data is loaded into the coder 88. The coder 88 utilizes the foregoing data to provide code words which are stored in the memory 92 and are applied as addresses to the ROM 201 for providing alphanumeric symbols corresponding to the code words. The generation of the alphanumeric symbols by the ROM 201 in FIG. 4C is the same as the symbols generated by the ROM 201 of the print system 400 in FIGS. 3C, assuming that the bar code was validly imprinted on the mailpiece 22. The contents of the ROM 424 and 201 may comprise the actual form of the respective symbols or, alternatively, may comprise a digital word identifying the alphanumeric symbol. In either case, the contents of the ROM 424 and the ROM 201 are clocked out by signals of the timing unit 106 into the correlator 428. The correlator 428 correlates the symbols of the respective ROMs 424 and 201 to determine that the code characters actually read by the reader 422 agree with those predicted by the operation of the coder 88 based on the date, the fee, and the serial number of the sending station. Upon obtaining a satisfactory correlation, the correlator 428 activates the display 54 to show verification of the printed message.

It is further noted that a mailpiece sorting system (not shown) may be coupled to the bar-code reader 422 for use in those situations wherein a zip code or other routing code has been imprinted on the package. Upon recognition of the routing code, the sorter then dispenses various packages in a series of such packages into various bins for automatic sorting of mail and similar packages. The output signal of the correlator 428 may be utilized to activate the sorter so that no sorting takes place unless the message imprinted by the bar code on the package 22 has been declared valid. Thereby, an automatic sorting system can be used with a secure routing indicia imprinted on the packages.

COMBINATION OF ALPHANUMERIC AND BAR CODES INDICIA

Figure 3D:
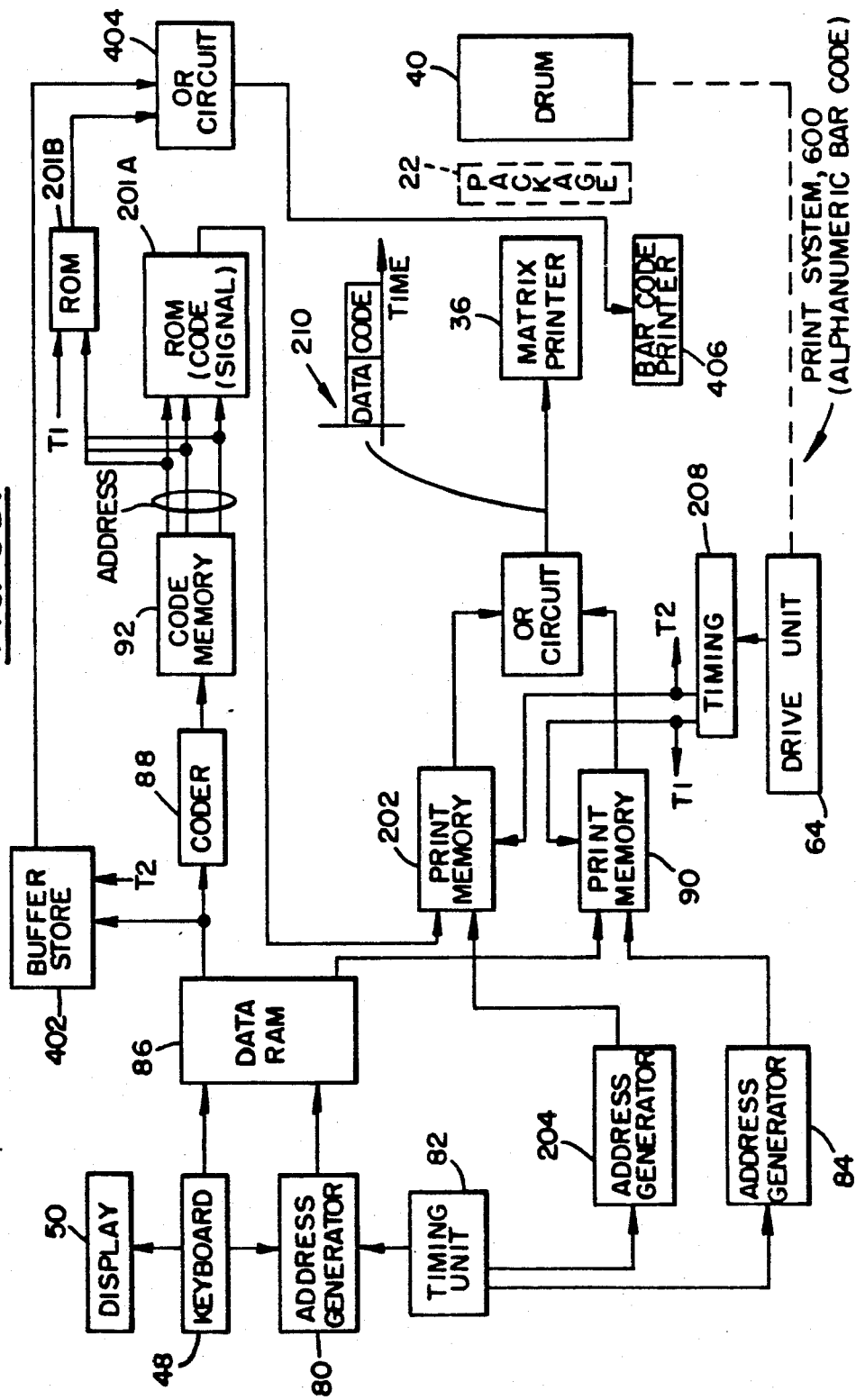
FIG. 3D is a block diagram of a fourth embodiment of the print system of FIG. 1 combining features of FIGS. 3B and 3C.

The alphanumeric print system 200 of FIG. 3B and the bar-code print system 400 of FIG. 3C may be combined to form the print system 600 of FIG. 3D. In comparing FIGS. 3C and 3B with 3D, it may be seen that each of these systems employ the keyboard 48, the RAM 86 the coder 88, the code memory 92 and the drum 40. Accordingly, the combined system 600 uses the foregoing components to activate both the matrix printer 36 and the bar-code printer 406. In the physical construction of the system 600, the two printers 36 and 406 may be positioned side-by-side so as to provide, simultaneously, both the alphanumeric and the bar-code indicia.

If desired, the bar-code printer 406 could employ the apparatus of the matrix print head of the printer 36, in which case each bar of the code would be printed as an array of closely spaced dots. Furthermore, if the alphanumerics and the bar code are to be printed sequentially, rather than side-by-side, then a single print head could be used for both imprintings with the control circuitry being alternately switched from the alphanumerics to the bar code. This system is advantageous in that it permits the automatic sorting of mail, the automatic verification of the indicia, as well as the manual reading of the indicia so that personnel handling packages and mail can visually identify the imprinted legends if they so desire.

Figure 4D:
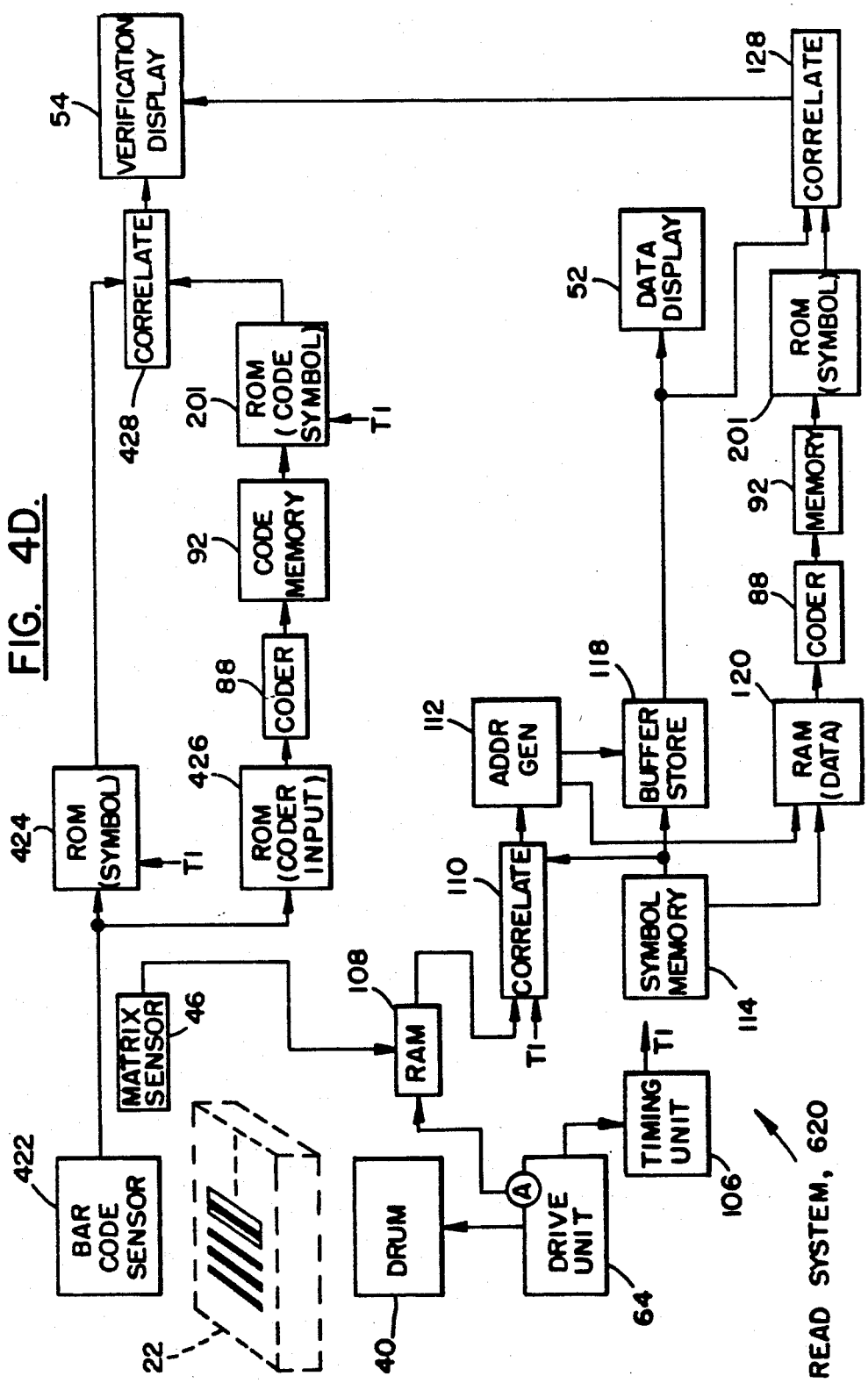
FIG. 4D is a block diagram of a fourth embodiment of the read system of FIG. 1 combining features of FIGS. 4B and 4C.

The companion read system 620 is shown in FIG. 4D. The system 620 incorporates components of the system 34 of FIG. 4A for reading printed alphanumeric characters and other symbols. Also included are both the bar-code reader 422 and the matrix sensor 46 for reading respectively the bar code and the alphanumeric characters. Also included are the drum 40, the drive unit 64 and the timing units 106 of both FIGS. 4A and 4C. Interpretation of the bar code is accomplished with the aid of the ROMs 424 and 426, the coder 88, the code memory 92 and the ROM 201 of FIG. 4C. The character processing is implemented by use of the RAM 108, the correlator 110, the address generator 112, the symbol memory 114, the buffer storage 118 and the RAM 120 of FIG. 4A. Also included, by way of a second channel in the signal processing of the system 620 are the coder 88, the code memory 92, the symbol ROM 201 and the correlator 128. The RAM 120, the coder 88 and the memory 92 function as was disclosed with reference to FIG. 4A. By use of the ROM 201, addressed by the memory 92, the character predicted by the coding operation is attained in a manner corresponding to that disclosed in FIG. 4C. The predicted character from the ROM 201 and the actually received character from the buffer storage units 118 are correlated by the correlator 128. The output of the correlation is applied to the verification display 54 along with the output of the correlator 428. Thereby, correlation and verification can be obtained from the examination of the bar code or from examination of the alphanumeric code characters. The display 54 will respond to a positive correlation from either of the correlators 428 and 128. The display 52 displays the characters which have been received, this includes both the data characters and the characters of the code. In the system 620, while the complete array of characters is displayed for an operator of the system, the correlation is accomplished automatically without aid of the operator, as distinguished from the manually-aided read-system 220 of FIG. 4B.

INTERLEAVING OF CODE WITH INDICIA

Figure 3E:
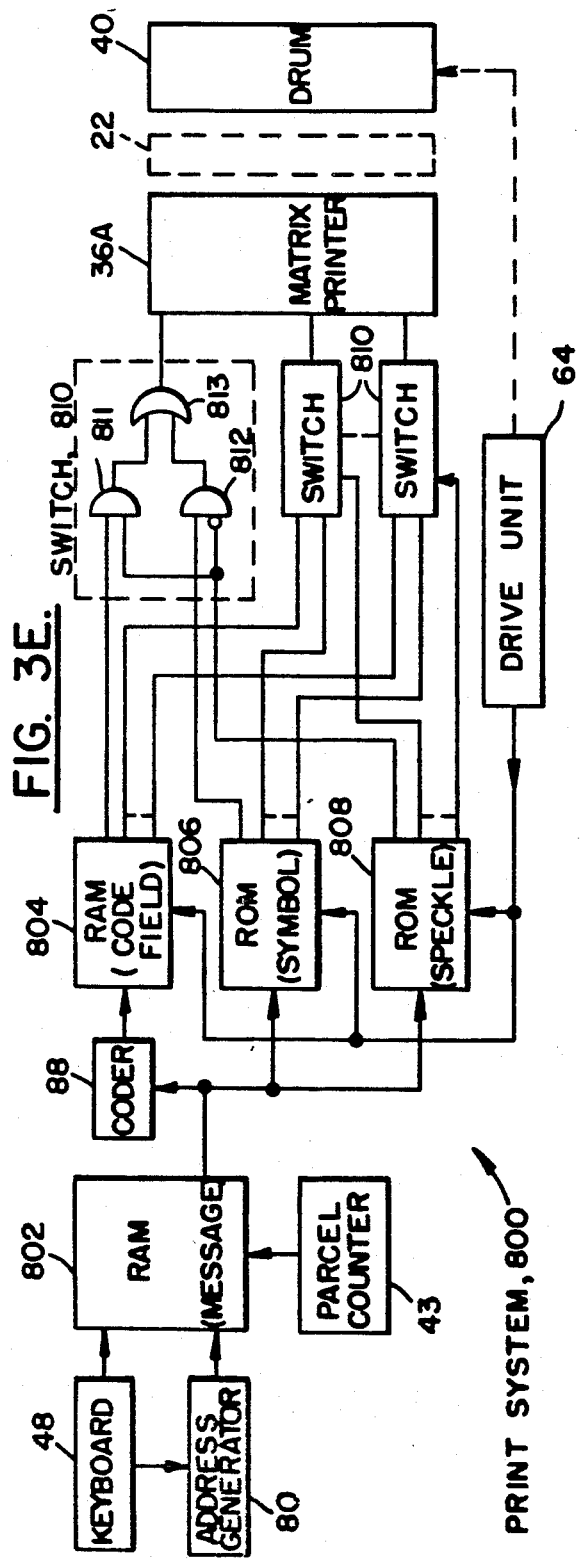
FIG. 3E shows a modification of the system of FIG. 3A for the interleaving of code and indicia by speckling.
Figure 6:
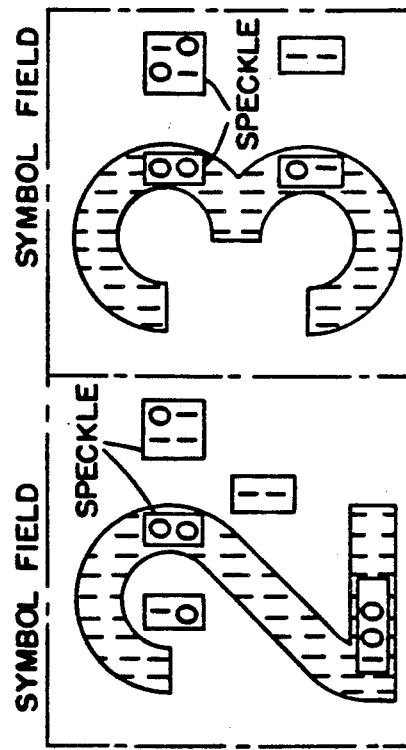
FIG. 6 shows a field of logic 1's and 0's for the embodiment of FIGS. 3E and 4E.
Figure 4E:
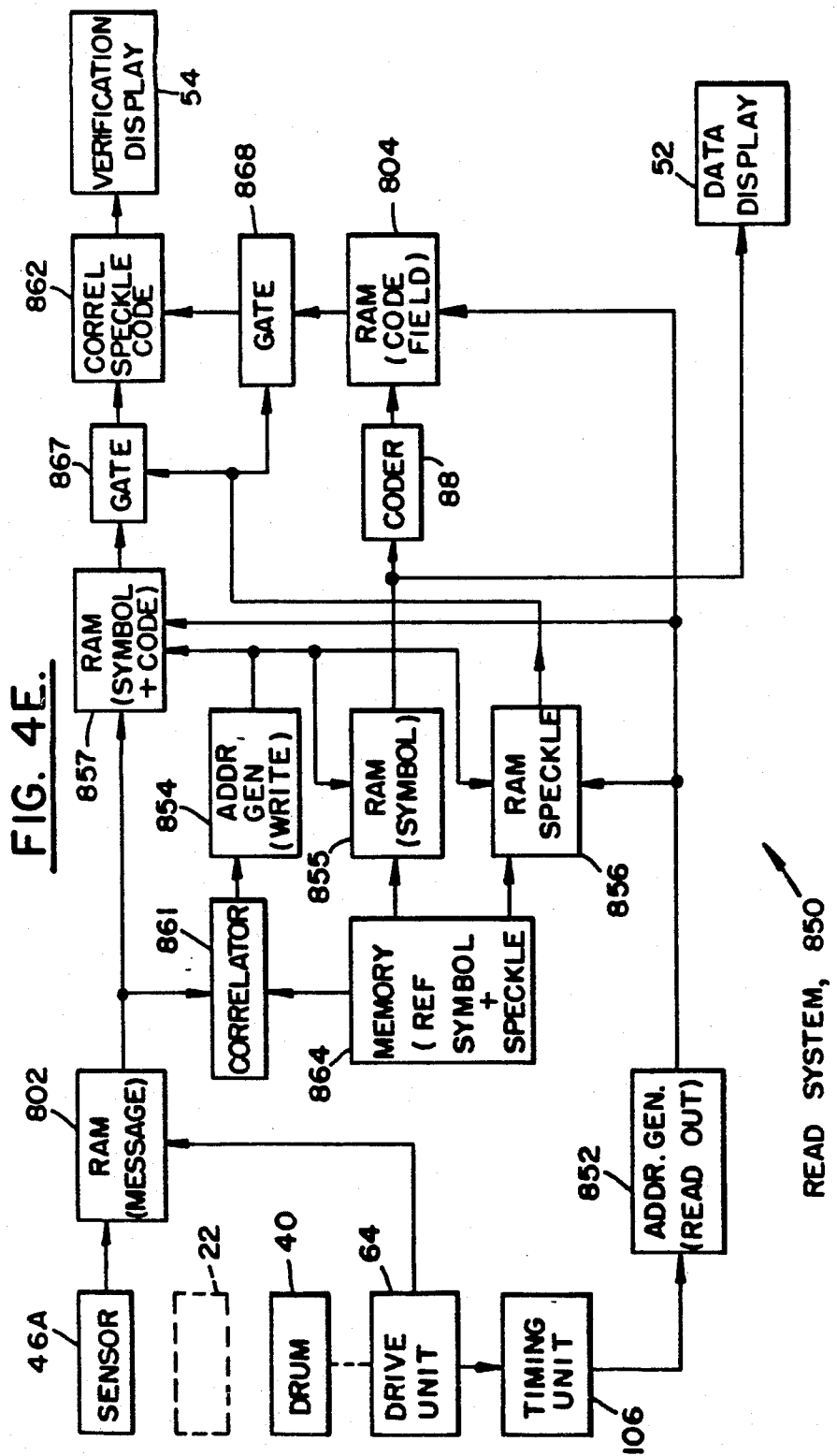
FIG. 4E shows a modification of the system of FIG. 4A for the interleaving of code and indicia by speckling.

With reference now to FIGS. 3E, 4E and 6, there is described an alternative form of the print and read systems utilizing an interleaving of the code with the indicia by speckling the indicia with portions of a code disposed as 1's and 0's across the field of the indicia. Such speckling is shown in FIG. 6, while the corresponding print system 800 and the read system 850 are shown, respectively, in FIGS. 3E and 4E.

The print system 800 is a modification of the system 32 of FIG. 3A and incorporates the keyboard 48, the address generator 80, the piece counter 43, the coder 88, the drive unit 64, and the drum 40 shown previously in FIG. 4A. Instead of the 7 by 5 matrix format previously described, a larger field is employed to more easily implement the speckling procedure. For example, a 9 by 9 or larger matrix may be employed. Accordingly, the matrix printer of FIG. 3A has been replaced by a larger-format printer 36A in FIG. 3E. The system 800 further comprises RAM's 802 and 804, ROM's 806 and 808, and a set of switches 810 of which there is one switch for each row of the indicia matrix. Each switch 810 comprises two AND gates 811-812, and an OR gate 813.

The speckling procedure, as demonstrated in FIG. 6, interjects light areas into the dark coloration of the indicia, such as the exemplary numerals 2 and 3 of FIG. 6, and interjects dark areas into the relatively light coloration of the background. The logic 1's represent points of impact of the print head while the logic 0's represent areas where no markings have been applied by the print head. In each symbol field, regions have been set aside for the speckling, the speckling in each of the regions being done on a random or pseudorandom basis.

In operation, the keyboard 48 and the counter 43 input data into the memory 802 in accordance with addresses provided by the generator 80. As has been described previously, the counter 43 counts mail pieces, packages, and other forms of parcels and labels which pass by the matrix printer 36A for the imprinting of postage or other message. A mailpiece 22 is shown in phantom as it is moved past the head of the matrix printer 36A by the drum 40. The data stored in the memory 802 forms the message which is to be imprinted on the mailpiece 22. Other sources of data such as the weight and serial number, described hereinabove, have been deleted in FIG. 3E to facilitate the description. The data stored in the memory 802 is applied to the coder 88 for the formation of the field of 1's and 0's, which field is stored in the memory 804. The arrangement of the stored field is similar to that shown in the memory 92 of FIG. 3A, the stored field being larger in the memory 804 to accommodate the larger array of the indicia of FIG. 6.

The matrix printer 36A comprises a set of print points 96, as does the printer 36 of FIG. 3A, for printing a set of dots to form each symbol of the indicia. The rows and columns of the dots for each symbol are stored in the read-only memory 806, the dots of the respective rows being applied via corresponding ones of the switches 810 to the respective print points 96 of the printer 36A. The stored data in the RAM 802 is applied to the ROM 806 as an address to select the sequence of symbols for which the ROM 806 is to supply the dots to the printer 36A. Each of the switches 810, in addition to receiving the dots for a specific row of a symbol, also receives the dots from the RAM 804 for a specific row of the code. The speckling is accomplished by momentarily operating individual ones of the switches 810 to substitute dots of the code for dots of the field of a symbol.

The selection of the speckled regions differs with the various alphanumeric symbols, the locations and sizes of the speckled regions being chosen so as to retain legibility of the symbols as demonstrated in FIG. 6. The ROM 808 stores the location of each pixel in each of the speckled regions for each symbol, and is addressed by the RAM 802 concurrently with the addressing of the ROM 806. Thereby, the speckle data and the symbol data for the imprinting of the complete message are available in the memories 808 and 806.

In each switch 810, the AND gates 811-812 are connected to an output line of the memory 808, the connection to the gate 812 being complemented to provide for alternate actuation of the gates 811-812 by output signals of the memory 808. The gate 811 connects with the code memory 804, and the gate 812 connects with the symbol memory 806. The output terminals of the gates 811-812 are coupled via the OR gate 813 to the printer 36A. Thereby, in response to a logic 0 outputted from the speckle memory 808, dots of the symbol are printed, and in response to a logic 1 outputted from the speckle memory 808, dots of the code field are printed by the printer 36A. The drive unit 64 activates the three memories 804, 806 and 808 to output their respective signals concurrently with the operation of the drum 40, such operation of the drive unit 64 conforming to the description presented above for the system of FIG. 3A. Thereby, the print system 800 of FIG. 3E interleaves speckles of the code field with the printed indicia in a manner which preserves legibility of the message while permitting personnel utilizing the system 800 to observe the nature of the coding.

The operation of the read system 850 of FIG. 4E parallels that of the read system 34 of FIG. 4A in that the received signals are first correlated against a reference to identify the received signals, after which identification specific portions of the indicia carrying elements of the code are compared against a regenerated replica of the code. The system 850 includes the drum 40, the drive unit 64, the timing unit 106, the coder 88, and the displays 52 and 54 which were previously described with reference to FIG. 4A. Also included is a matrix photo sensor 46A for viewing the received indicia, the sensor 46A operating in a manner similar to that of the sensor 46 of FIG. 4A but having additional photo sensing elements for the enlarged dot-matrix format of the indicia printed by the system 800 on an object such as the package 22.

The read system 850 further comprises address generators 852 and 854, RAM's 855, 856 and 857, correlators 861-862, a memory 864, and gates 867-868. The arrangement of dots sensed by the sensor 46A is stored in the RAM 802 concurrently with an addressing of the RAM 802 by the drive unit 64 in synchronism with the operation of the drum 40 for positioning the package or mailpiece 22. A reference dot-matrix array for each symbol is stored in the memory 864 to be correlated against the message symbols of the RAM 802 by the correlator 861. The correlation is based on the complete symbol field (FIG. 6) minus the portions reserved for the speckled regions. Thereby, the symbols of the message can be accurately identified by the correlation process.

In operation, upon attainment of a correlation, the correlator strobes the address generator 854 to address the memories 857, 855 and 856 to store, respectively, the dot-matrix pattern of the received symbols from the RAM 802, the identify of the received symbol, and the pixel locations of the corresponding speckled regions The latter is stored in the memory 864 along with the dot-matrix patterns of the reference symbols. The symbols stored in the RAM 855 are outputted to the display 52 so that personnel can read the message.

Verification of the coded portions of the message, so as to insure the integrity of the message, is accomplished as follows The coder 88 is also coupled to the output terminal of the RAM 855 and, upon receipt of data in the message, regenerates the code and stores the code field in the RAM 804. The code and symbol data stored in the RAM 857, and the code data stored in the RAM 804 are then read out via the gates 867-868, respectively, to the correlator 862. This reading out is accomplished under control of the address generator 852 which operates in response to timing signals of the timing unit 106. The operation of the timing unit 106 has been described hereinabove. Thus, the generator 852 addresses the RAM's 857 and 804 after the storage of their respective data has been completed.

The generator 852 also addresses the RAM 856 to activate the gates 867–868 to pass the respective output signals of the RAM's 857 and 804. Such activation occurs only within the designated regions for the speckling of the code, such data being stored in the RAM 856. Thereby, the correlator 862 is able to correlate the regions of the code field presented in the speckling with the corresponding reference regions of the code field to verify that the received message is true. The correlator 862 then strobes the display 54 to indicate the verification.

It is to be understood that the above described embodiments of the invention are illustrative only and that modifications thereof may occur to those skilled in the art. Accordingly, this invention is not to be regarded as limited to the embodiments disclosed herein, but is to be limited only as defined by the appended claims.

What is claimed is:

1. A device for the metering of encrypted postage and similar indicia comprising:
   (a) an entry means for the entry of data corresponding to alphanumeric characters;
   (b) means coupled to said entry means for the storage of said data;
   (c) an encryption circuit for developing a code word of a plurality of code characters from data in said storage means corresponding to a plurality of said alphanumeric characters;
   (d) means for imprinting an alphanumeric representation of data applied thereto; and
   (e) selection means having an output coupled to said imprinting means and coupled to receive data from said storage means and said encryption circuit for alternately feeding data of said storage means and a code word of said encryption circuit to said imprinting means to control the imprinting means to imprint a set of alphanumeric indicia corresponding to alphanumeric characters entered in said entry means with said code characters of said code word being interleaved therewith, the imprinted alphanumeric characters corresponding to said code words providing verification of the validity of the indicia.

2. The device of claim 1 wherein said imprinting means includes a printhead for imprinting marks on a printing medium.

3. The device of claim 2 wherein said entry means comprises a keyboard and wherein said device includes means for moving the printing medium past said printhead.

4. The device of claim 3 wherein said printing medium is a package, said device further comprising means coupled to said moving means for synchronizing said data reading means with the position of said package.

5. The device of claim 3 further comprising timing means coupled to said moving means for synchronizing said imprinting selecting means with said data reading means.

6. A system for the printing and reading of encrypted message wherein the message is printed in visibly readable format on a printing medium, such system comprising:
   (a) a data entry means and a coder;
   (b) a printer of alphanumeric characters;
   (c) means coupled to said data entry means and said coder for driving said printer, said driving means comprising means for alternately applying signals of said data entry means and signals of said coder to said printer printing a set of alphanumeric characters corresponding to signals from said entry means and interleaved with alphanumeric characters corresponding to signals from said coder;
   (d) means for reading the interleaved printed data material printed by said printer;
   (e) means coupled to said reading means for generating a reference code in accordance with the alphanumeric characters corresponding to signals of said coder printed by said printer; and
   (f) means responsive to said reference code generating means for verifying printed alphanumeric characters corresponding to signals from said data entry means.

7. A system according to claim 6 wherein said printer includes a printhead and means for moving said printing medium past said printhead.

8. A system according to claim 7 wherein said moving means includes means responsive to positions of said medium for synchronizing said printer driving means with the movement of said medium.

9. In a device for the metering of postage and similar indicia on a material to be imprinted, wherein the device comprises means for receiving signals corresponding to data to be imprinted, and means responsive to said received signals for imprinting said indicia in the form of first alphanumeric characters representing said data at different locations on the material; the improvement comprising means for deriving encryption signals from said received signals and corresponding to at least on encrypted alphanumeric character, and means applying said encryption signals to said imprinting means, said imprinting means comprising means for printing at least one alphanumeric character corresponding to the encryption signals between imprinted characters of a set of said first alphanumeric characters.

10. A device for verifying alphanumeric indicia including postal data and encrypted material derived from said postal data, said indicia being printed on a printing medium, comprising:
   means for reading alphanumeric indicia on said printing medium, said indicia having a set of alphanumeric characters corresponding to postal data and encrypted material interleaved between said characters;
   means responsive to alphanumeric indicia read by said reading means for generating signals corresponding to the data and the encrypted material; and
   means for comparing said signals to verify the indicia.

11. A package having a postage indicia imprint supported thereon relating to a characteristic of said package, said indicia including means for validating the integrity of the indicia, the indicia comprising a set of alphanumeric characters including:
   a first encoded alphanumeric portion representing the value of the imprint, said value corresponding to a postal amount for the mailing of said package;
   a second alphanumeric portion for indicating other information, characters of said second indicia portions being imprinted on said package interleaved between characters of said first indicia portion;

the second indicia portion being an encrypted function of said value, the encrypted message providing information validating the integrity of the postage indicia.

12. A package having an imprint supported thereon and comprising:
an indicia including a set of alphanumeric characters having a first portion representing the value of the imprint, and a second portion representing an encryption of the value and other information of the package, with characters of said second portion being interleaved with characters of said first portion, said set of characters being imprinted on the package, the encryption being an indication that the imprint is valid, the value of the imprint representing a postal value for the mailing of the package.

13. In a postage meter, a system for providing validation information to an alphanumeric postage imprint produced by the meter, the validation system comprising:
alphanumeric printing means;
means coupled to the printing means for controlling the operation of the printing means; and
means coupled to the controlling means for alternately applying alphanumeric data corresponding to postage information and encryption data dependent upon the postage information to said controlling means, said controlling means comprising means for controlling said printing means to print an imprint in the form of a set of alphanumeric characters having a sequence of interleaved portions representative alternately of the postal information and encryption data respectively, to provide an indication that the postage imprint is valid.

14. In a method for printing postal indicia that includes postal information on a mail piece comprising employing a device including an alphanumeric printing means and a means for controlling the printing means, the method of validating the postal indicia comprising the steps of:
generating encryption data dependent upon said postal information; and
controlling the operation of the printing means to print an alphanumeric indicia with a multiple sequence of separate adjacent interleaved portions that alternately represent the encryption data of said postal information.

15. The method of claim 14 in which the postal information comprises a value, further including the step of printing the value in alphanumeric characters along with the encryption data on the mail piece.

16. A system for reading encrypted messages on a printing medium, the encrypted message being provided on an alphanumeric indicia having adjacent interleaved alphanumeric portions that alternately represent a plurality of data and encrypted material, said system comprising:
means for reading said alphanumeric indicia on said medium;
coding means coupled to said reading means for generating code signals and for generating a second signal representing said alphanumeric indicia; and
means for comparing a code read by said reading means with said second signal at a determined time for verification of said alphanumeric indicia.

17. The method of metering postage and similar indicia, comprising:
inputting data signals corresponding to postal information;
encoding said data signals to produce code signals, and alternately applying said data signals and said coded signal to an alphanumeric printer for printing indicia on a piece of mail having a sequence of adjacent alphanumeric portions with multiple adjacent portions thereof being interleaved to alternately represent a plurality of said data signals and said coded signals.

* * * * *